(12) United States Patent
Zhao

(10) Patent No.: US 10,604,379 B2
(45) Date of Patent: Mar. 31, 2020

(54) ELEVATOR SYSTEM BELT WITH FABRIC TENSION MEMBER

(71) Applicant: Otis Elevator Company, Farmington, CT (US)

(72) Inventor: Chen Qian Zhao, Newark, DE (US)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 15/958,698

(22) Filed: Apr. 20, 2018

(65) Prior Publication Data

US 2018/0305181 A1 Oct. 25, 2018

Related U.S. Application Data

(60) Provisional application No. 62/487,877, filed on Apr. 20, 2017.

(51) Int. Cl.
*B66B 7/06* (2006.01)
*F16G 5/08* (2006.01)
(Continued)

(52) U.S. Cl.
CPC .............. *B66B 7/062* (2013.01); *D07B 1/005* (2013.01); *D07B 1/162* (2013.01); *D07B 1/165* (2013.01);
(Continued)

(58) Field of Classification Search
CPC ........ B66B 7/062; D07B 1/005; D07B 1/162; D07B 1/165; F16G 5/08; F16G 5/14
See application file for complete search history.

(56) References Cited

U.S. PATENT DOCUMENTS 4,022,010 A * 5/1977 Gladenbeck ........... D07B 1/025
57/231
5,881,843 A * 3/1999 O'Donnell ............... B66B 7/06
187/254
(Continued)

FOREIGN PATENT DOCUMENTS

CN 205636323 U 10/2016
WO 0114630 A1 3/2001
(Continued)

OTHER PUBLICATIONS

European Search Report Issued in EP Application No. 18168615.5, dated Oct. 24, 2018, 9 Pages.

*Primary Examiner* — Michael A Riegelman
(74) *Attorney, Agent, or Firm* — Cantor Colburn LLP

(57) ABSTRACT

A belt for an elevator system includes a tension member extending at least partially across a belt width and extending longitudinally along a length of the belt, the tension member formed at least partially from a plurality of aromatic polyester based fibers, and a jacket material at least partially encapsulating the tension member. An elevator system includes a hoistway, an elevator car located in the hoistway and movable therein, and a belt operably connected to the elevator car to suspend and/or drive the elevator car along the hoistway. The belt includes a tension member extending at least partially across a belt width and extending longitudinally along a length of the belt. The tension member is formed at least partially from a plurality of aromatic polyester based fibers. A jacket material at least partially encapsulates the tension member.

11 Claims, 4 Drawing Sheets

(51) Int. Cl.
*F16G 5/14* (2006.01)
*D07B 1/16* (2006.01)
*D07B 1/00* (2006.01)
*D07B 1/22* (2006.01)

(52) U.S. Cl.
CPC ................ *F16G 5/08* (2013.01); *F16G 5/14* (2013.01); *D07B 1/22* (2013.01); *D07B 2201/2083* (2013.01); *D07B 2501/2007* (2013.01)

(56) References Cited

U.S. PATENT DOCUMENTS

| | | | | |
|---|---|---|---|---|
| 6,295,799 | B1* | 10/2001 | Baranda | B66B 7/062 57/221 |
| 6,321,520 | B1* | 11/2001 | De Angelis | D07B 1/025 57/223 |
| 6,364,063 | B1* | 4/2002 | Aulanko | B66B 11/008 187/251 |
| 6,672,046 | B1* | 1/2004 | Prewo | D07B 1/005 57/232 |
| 7,828,121 | B2* | 11/2010 | Parrini | D07B 1/02 187/251 |
| 8,479,888 | B2* | 7/2013 | Goser | F16G 5/20 187/255 |
| 2009/0126296 | A1* | 5/2009 | Veronesi | B66B 7/062 52/223.1 |
| 2011/0000746 | A1* | 1/2011 | Pelto-Huikko | B66B 7/062 187/254 |
| 2011/0259677 | A1* | 10/2011 | Dudde | B66B 7/062 187/411 |
| 2012/0329591 | A1* | 12/2012 | Goeser | B66B 7/062 474/238 |
| 2013/0048432 | A1* | 2/2013 | Alasentie | B66B 7/062 187/251 |
| 2014/0004298 | A1* | 1/2014 | Reif | B29D 29/00 428/113 |
| 2014/0008154 | A1* | 1/2014 | Wesson | B66B 7/062 187/254 |
| 2014/0305744 | A1* | 10/2014 | Kere | B66B 7/1238 187/254 |
| 2014/0305745 | A1* | 10/2014 | Alasentie | B66B 9/00 187/266 |
| 2015/0017436 | A1* | 1/2015 | Krishnan | B66B 7/062 428/365 |
| 2015/0191331 | A1* | 7/2015 | Orelup | D07B 1/22 428/76 |
| 2016/0060077 | A1* | 3/2016 | Haapaniemi | B66B 9/00 187/255 |
| 2016/0083224 | A1* | 3/2016 | Kere | B66B 7/06 187/249 |
| 2017/0043979 | A1* | 2/2017 | Kucharczyk | B66B 7/062 |
| 2017/0217729 | A1* | 8/2017 | Lehtinen | B66B 7/062 |
| 2018/0127240 | A1* | 5/2018 | Zafiris | B66B 7/062 |
| 2018/0170713 | A1* | 6/2018 | Sherrick | B66B 7/062 |
| 2018/0186604 | A1* | 7/2018 | Helenius | D07B 5/006 |
| 2018/0208436 | A1* | 7/2018 | Schmidt | B66B 7/085 |
| 2018/0229970 | A1* | 8/2018 | Lehtinen | B66B 7/062 |
| 2018/0282125 | A1* | 10/2018 | Zhao | D07B 1/16 |
| 2018/0305178 | A1* | 10/2018 | Martin | B66B 7/062 |
| 2018/0305180 | A1* | 10/2018 | Guilani | D07B 1/22 |
| 2018/0305181 | A1* | 10/2018 | Zhao | B66B 7/062 |
| 2018/0306752 | A1* | 10/2018 | Puranen | B66B 7/1215 |
| 2018/0339882 | A1* | 11/2018 | Zhao | B66B 7/064 |
| 2019/0023535 | A1* | 1/2019 | Valjus | B66B 7/062 |
| 2019/0047821 | A1* | 2/2019 | Zhao | B66B 7/062 |
| 2019/0062114 | A1* | 2/2019 | Zhao | B66B 7/062 |
| 2019/0062115 | A1* | 2/2019 | Zhao | B66B 7/062 |
| 2019/0062116 | A1* | 2/2019 | Zhao | B66B 7/062 |
| 2019/0062117 | A1* | 2/2019 | Zhao | B66B 7/062 |
| 2019/0071281 | A1* | 3/2019 | Zhao | B66B 7/062 |
| 2019/0144241 | A1* | 5/2019 | Guilani | B66B 7/062 187/251 |
| 2019/0144243 | A1* | 5/2019 | Zhao | B66B 7/06 187/411 |
| 2019/0161321 | A1* | 5/2019 | Zhao | B66B 7/062 |
| 2019/0161322 | A1* | 5/2019 | Zhao | C08G 18/833 |
| 2019/0168999 | A1* | 6/2019 | Guilani | B66B 7/062 |
| 2019/0202666 | A1* | 7/2019 | Juntunen | B66B 7/062 |
| 2019/0218061 | A1* | 7/2019 | Eastman | B66B 7/062 |

FOREIGN PATENT DOCUMENTS

| | | |
|---|---|---|
| WO | 2006057641 A2 | 6/2006 |
| WO | 2015126359 A1 | 8/2015 |
| WO | 2015134025 A1 | 9/2015 |
| WO | 2016096395 A1 | 6/2016 |

* cited by examiner

ELEVATOR SYSTEM BELT WITH FABRIC TENSION MEMBER

CROSS-REFERENCE TO RELATED APPLICATIONS

This application claims the benefit of 62/487,877, filed Apr. 20, 2017, which is incorporated herein by reference in its entirety.

BACKGROUND

Embodiments disclosed herein relate to elevator systems, and more particularly to load bearing members to suspend and/or drive elevator cars of an elevator system.

Elevator systems are useful for carrying passengers, cargo, or both, between various levels in a building. Some elevators are traction based and utilize load bearing members such as ropes or belts for supporting the elevator car and achieving the desired movement and positioning of the elevator car.

Metal ropes for high rise lifting are heavy and large relative to their tensile strength and stiffness. Alternatively, belts are often used as load bearing members. Where a belt is used as a load bearing member, a plurality of tension members, or cords, are embedded in a common jacket. The jacket retains the cords in desired positions and provide a frictional load path. In an exemplary traction elevator system, a machine drives a traction sheave with which the belts interact to drive the elevator car along a hoistway. Belts typically utilize tension members formed from steel elements, but these belts have many of the same issues as steel ropes in high rise lifting applications. Alternatively may utilize tension members formed composites, such as carbon fiber composites.

In a carbon fiber composite tension member, the members have good strength to weight characteristics, but typically have reduced flexibility due to the rigid thermoset matrix utilized, and also reduced high temperature performance compared to tension members formed from steel wires.

BRIEF DESCRIPTION

In one embodiment, a belt for an elevator system includes a tension member extending at least partially across a belt width and extending longitudinally along a length of the belt, the tension member formed at least partially from a plurality of aromatic polyester based fibers, and a jacket material at least partially encapsulating the tension member.

Additionally or alternatively, in this or other embodiments the aromatic polyester based fibers are formed into a fabric.

Additionally or alternatively, in this or other embodiments the fabric further includes carbon fibers, glass fibers, aramid fibers, ultrahigh molecular weight polyethylene, ultrahigh molecular weight polypropylene, polybenzoxazole fiber or nylon formed as part of the fabric including a plurality of aromatic polyester based fibers.

Additionally or alternatively, in this or other embodiments the tension member includes a plurality of fabric layers arrayed in a belt thickness direction.

Additionally or alternatively, in this or other embodiments a plurality of tension members are arranged across the belt width.

Additionally or alternatively, in this or other embodiments the tension member includes a cord including a plurality of load carrying fibers and at least one layer of aromatic polyester based fibers at least partially surrounding the cord.

Additionally or alternatively, in this or other embodiments the load carrying fibers are one or more of carbon, glass, aramid, nylon, and polymer fibers.

Additionally or alternatively, in this or other embodiments the plurality of load carrying fibers are positioned in a matrix material.

Additionally or alternatively, in this or other embodiments the jacket materials are selected from the group consisting of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber and any combination of at least of two compound.

In another embodiment, an elevator system includes a hoistway, an elevator car located in the hoistway and movable therein, and a belt operably connected to the elevator car to suspend and/or drive the elevator car along the hoistway. The belt includes a tension member extending at least partially across a belt width and extending longitudinally along a length of the belt. The tension member is formed at least partially from a plurality of aromatic polyester based fibers. A jacket material at least partially encapsulates the tension member.

Additionally or alternatively, in this or other embodiments the plurality of aromatic polyester based fibers are formed into a fabric.

Additionally or alternatively, in this or other embodiments the fabric further includes carbon fibers, glass fibers, aramid fibers, ultrahigh molecular weight polyethylene, ultrahigh molecular weight polypropylene, polybenzoxazole fiber or nylon formed as part of the fabric including a plurality of aromatic polyester based fibers Additionally or alternatively, in this or other embodiments the tension member includes a plurality of layers arrayed in a belt thickness direction.

Additionally or alternatively, in this or other embodiments a plurality of tension members are arranged across the belt width.

Additionally or alternatively, in this or other embodiments the tension member includes a cord including a plurality of load carrying fibers, and at least one layer of aromatic polyester based fibers at least partially surrounding the cord.

Additionally or alternatively, in this or other embodiments the load carrying fibers are one or more of carbon, glass, aramid, nylon, and polymer fibers.

Additionally or alternatively, in this or other embodiments plurality of load carrying fibers are located in a matrix material

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
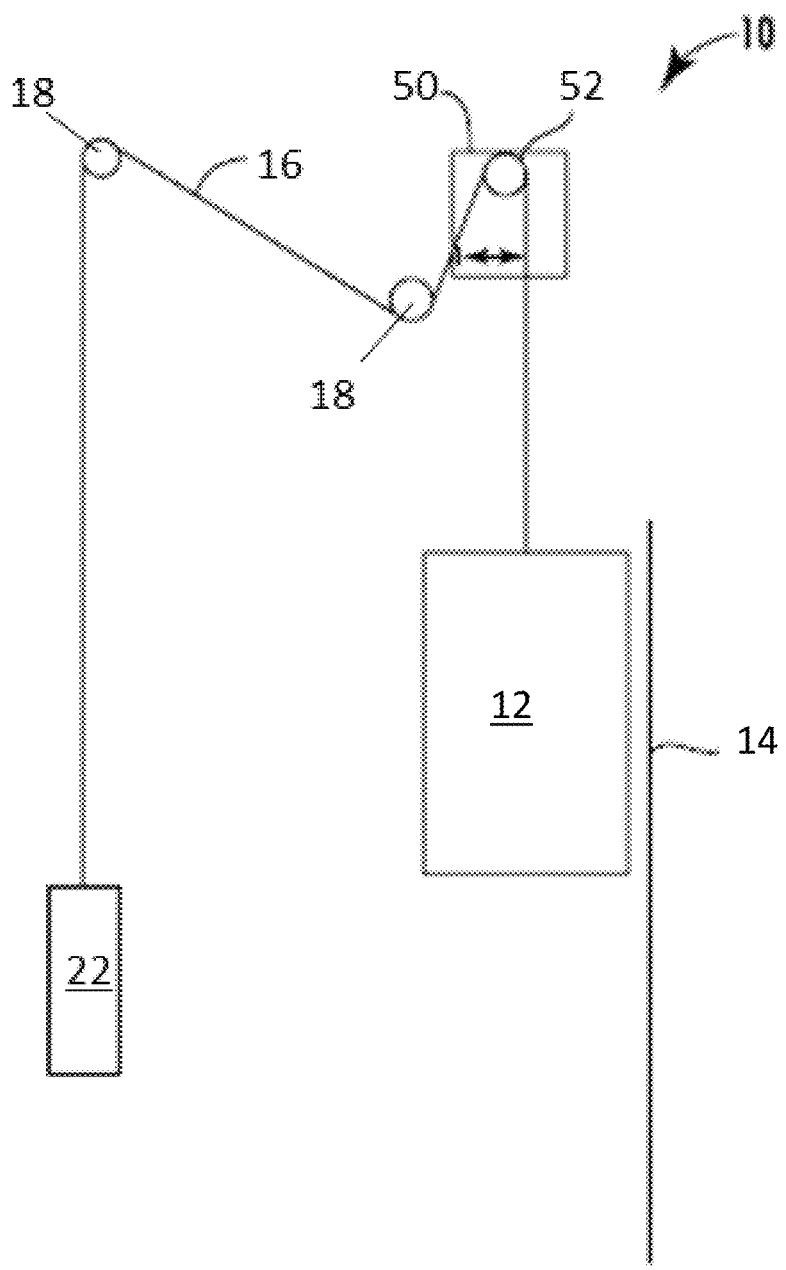
FIG. 1 is a schematic illustration of an embodiment of an elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a traction sheave 52. The traction sheave 52 is driven by a machine 50. Movement of drive sheave by the machine 50 drives, moves and/or propels (through traction) the one or more belts 16 that are routed around the traction sheave 52. At least one of the sheaves 18 could be a diverter, deflector or idler sheave. Diverter, deflector or idler sheaves are not driven by a machine 50, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 or only one side of the one or more belts 16 engages the one or more sheaves 18. The embodiment of FIG. 1 shows a 1:1 roping arrangement in which the one or more belts 16 terminate at the car 12 and counterweight 22, while other embodiments may utilize other roping arrangements.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
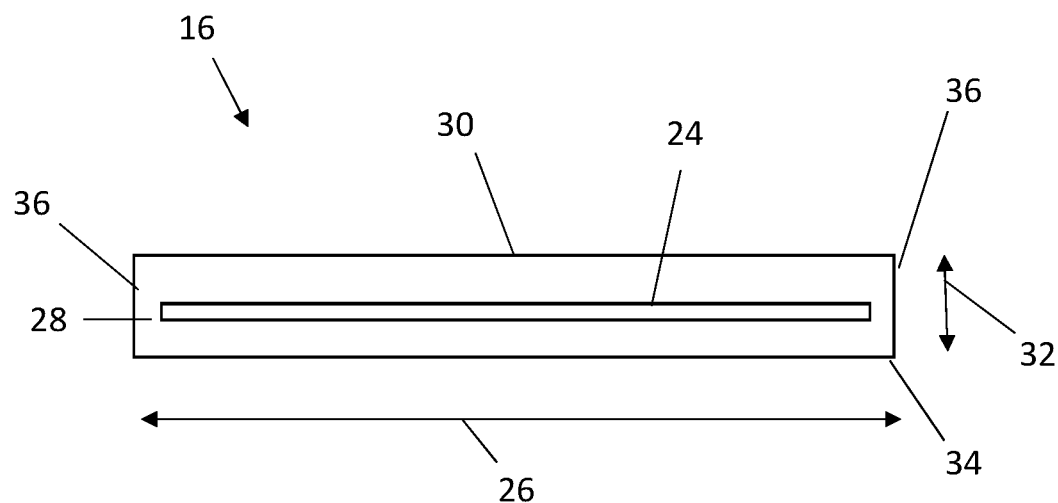
FIG. 2 is a schematic cross-sectional view of an embodiment of an elevator system belt.

FIG. 2 provides a cross-sectional schematic of an exemplary belt 16 construction or design. The belt 16 includes a tension member 24 extending longitudinally along the belt 16 and also extending at least partially arranged across a belt width 26. The tension member 24 is at least partially enclosed in a jacket material 28 to restrain movement of the tension member 24 in the belt 16 and to protect the tension member 24. The jacket material 28 defines a traction side 30 configured to interact with a corresponding surface of the traction sheave 52. Exemplary materials for the jacket material 28 include the elastomers of thermoplastic polyurethanes, polyamide, thermoplastic polyester elastomers, and rubber, for example. Other materials may be used to form the jacket material 28 if they are adequate to meet the required functions of the belt 16. For example, a primary function of the jacket material 28 is to provide a sufficient coefficient of friction between the belt 16 and the traction sheave 52 to produce a desired amount of traction therebetween. The jacket material 28 should also transmit the traction loads to the tension member 24. In addition, the jacket material 28 should be wear resistant and protect the tension member 24 from impact damage, exposure to environmental factors, such as chemicals, for example.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34.

The tension member 24 is formed from a liquid crystal polymer material. Liquid crystal polymer is an aromatic polyester produced by polycondensation of 4-hydroxybenzoic acid and 6-hydroxynaphthalene-2-carboxylic acid. In some embodiments the liquid crystal polymer is a Vectran™ material. The liquid crystal polymer has a lower density than a typical carbon fiber, about 1.4 g/cm$^3$. Further the tensile strength of liquid crystal polymer is higher than that of typical carbon fiber profile, at about 3000-3200 Megapascals. In some embodiments, the liquid crystal polymer material is formed into a fabric via weaving or other process.

In some embodiments, the tension member 24 includes the liquid crystal polymer material with one or more of carbon fibers, glass fibers, aramid fibers, ultrahigh molecular weight polyethylene, ultrahigh molecular weight polypropylene, polybenzoxazole fiber or nylon formed as part of the liquid crystal polymer fabric. Further, in some embodiments the fabric forming the tension member 24 is formed from at least 50% liquid crystal polymer fiber.

Figure 3:
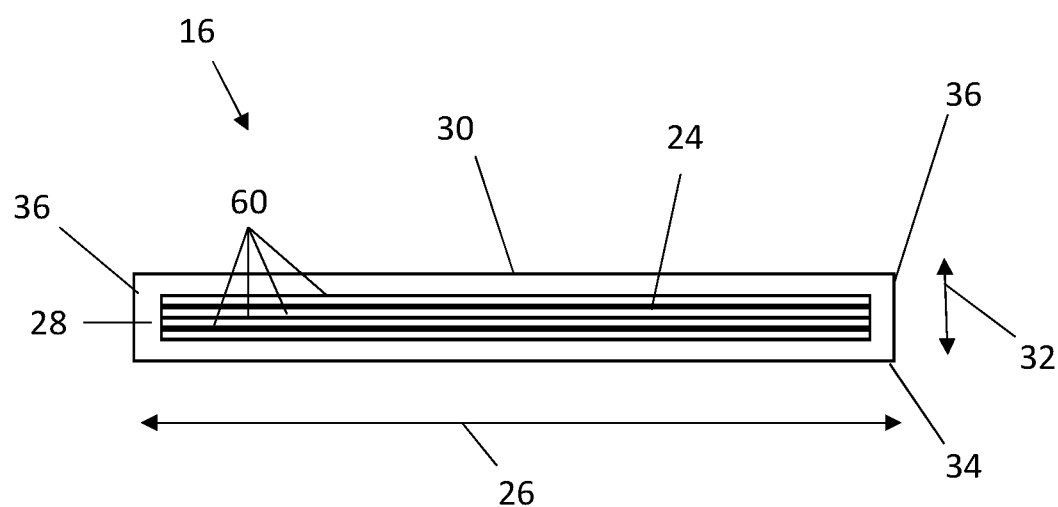
FIG. 3 is another schematic cross-sectional view of an embodiment of an elevator system belt.

In another embodiment, as shown in FIG. 3, the tension member 24 may include multiple fabric layers 60 stacked or arrayed along the belt thickness direction 32. In some embodiments, the fabric layers 60 may be laminated or joined by an adhesive, while in other embodiments, the fabric layers 60 are not joined by adhesive and maintained in position by only the surrounding jacket material 28. While in the embodiment shown the fabric layers 60 are identical with regard to size and shape, one skilled in the art will readily appreciate that those parameters may vary between fabric layers 60, depending on, for example, expected loads or other desired performance characteristics. Further, composition of the fabric layers 60 may vary.

Figure 4:
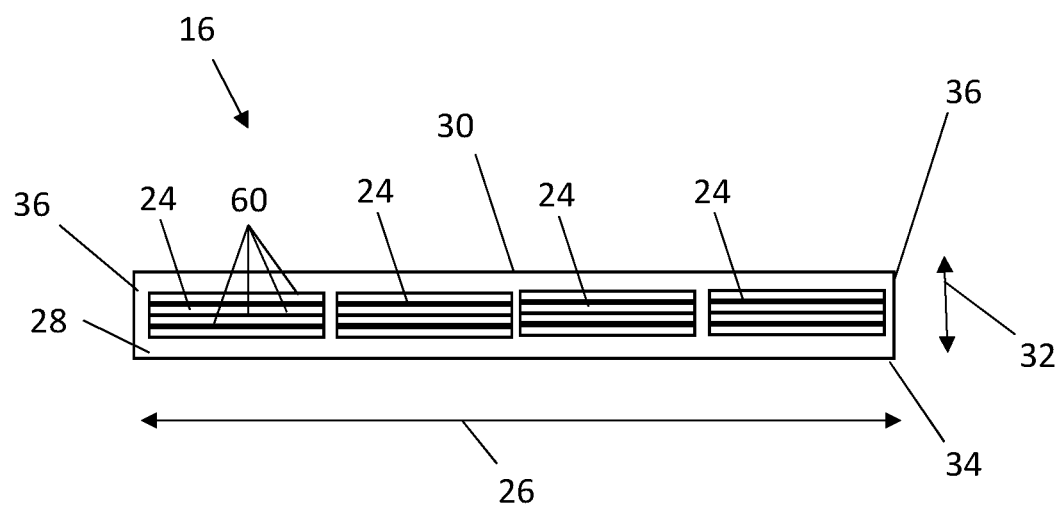
FIG. 4 is yet another schematic cross-sectional view of an embodiment of an elevator system belt.

Referring now to FIG. 4, in some embodiments, multiple tension members 24 may be arranged across the belt width 26, with each tension member 24 having one or more fabric layers 60. While in the embodiment shown the tension members 24 are identical with regard to size, shape, and number of fabric layers 60, one skilled in the art will readily appreciate that those parameters may vary between tension members 24, depending on, for example, expected loads or other desired performance characteristics. Further, composition of the fabric layers 60 may vary between tension members 24.

Figure 5:
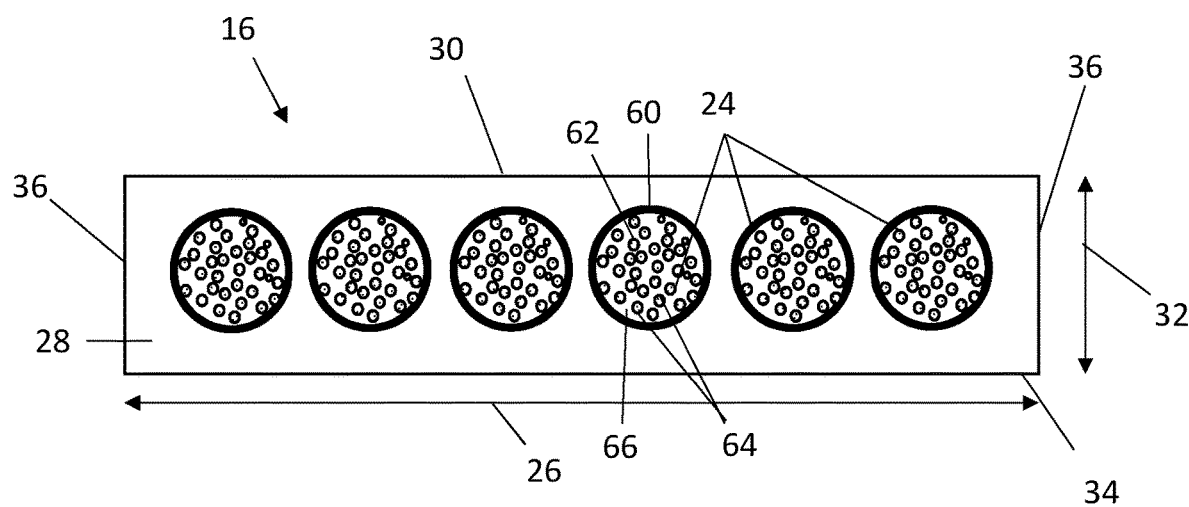
FIG. 5 is still another schematic cross-sectional view of an embodiment of an elevator system belt.

Referring now to FIG. 5, in some embodiments the tension member 24 is a of a hybrid construction, with a cord 62 wrapped or enveloped in one or more fabric layers 60. In some embodiments, the cord 62 is a composite member formed from a plurality of load carrying fibers 64 disposed in a matrix material 66. Exemplary load carrying fibers 64 include, but are not limited to liquid crystal polymer fibers, aramid fibers, ultrahigh molecular weight polyethylene, ultrahigh molecular weight polypropylene, poly-p-phenylenebenzobisoxazole (PBO) fibers, or combinations thereof. In other embodiments, a so-called "dry fiber" configuration is utilized, such that matrix material 66 is not utilized.

In addition, the matrix material 66 may be formed from any suitable material, such as polyurethane, vinylester, and epoxy for example. The materials of the load carrying fibers 64 and the matrix material 66 are selected to achieve a desired stiffness and strength of the tension member 24.

While six tension members 24 are illustrated in the embodiment of FIG. 5, other embodiments may include other numbers of tension members 24, for example, 4, 8, 10 or 12 tension members 24. Further, while the tension members 24 of the embodiment of FIG. 5 are substantially identical, in other embodiments, the tension members 24 may differ from one another.

Use of the aromatic polyester based fibers such as liquid crystal polymer in the tension member 24 reduces weight of the tension member 24 compared to a carbon fiber composite tension member or steel cord tension member, while also improving flexibility of the tension member 24, enabling reduced diameter sheaves 18 to be utilized in the elevator system 10.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for an elevator system, comprising:
   a plurality of tension members extending partially across a belt width and extending longitudinally along a length of the belt, each tension member of the plurality of tension members formed at least partially from a plurality of aromatic polyester based fibers, the plurality of aromatic based fibers formed into a fabric, tension member including a plurality of layers of the fabric stacked in a belt thickness direction; and
   a jacket material at least partially encapsulating the plurality of tension members;
   wherein the plurality of tension members are arrayed across the belt width direction, the jacket material further disposed between adjacent tension members of the plurality of tension members in the belt width direction.

2. The belt of claim 1, wherein the fabric further includes carbon fibers, glass fibers, aramid fibers, ultrahigh molecular weight polyethylene, ultrahigh molecular weight polypropylene, polybenzoxazole fiber or nylon formed as part of the fabric including a plurality of aromatic polyester based fibers.

3. The belt of claim 1, wherein the tension member includes:
   a cord including a plurality of load carrying fibers; and
   at least one layer of aromatic polyester based fibers at least partially surrounding the cord.

4. The belt of claim 3, wherein the load carrying fibers are one or more of carbon, glass, aramid, nylon, and polymer fibers.

5. The belt of claim 3, wherein the plurality of load carrying fibers are disposed in a matrix material.

6. The belt of claim 1, wherein the jacket materials are selected from the group consisting of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber and any combination of at least of two compound.

7. An elevator system, comprising:
   a hoistway;
   an elevator car disposed in the hoistway and movable therein;
   a belt operably connected to the elevator car to suspend and/or drive the elevator car along the hoistway, the belt including:
   a plurality of tension members extending partially across a belt width and extending longitudinally along a length of the belt, each tension member of the plurality of tension members formed at least partially from a plurality of aromatic polyester based fibers, the plurality of aromatic based fibers formed into a fabric, tension member including a plurality of layers of the fabric stacked in a belt thickness direction; and
   a jacket material at least partially encapsulating the plurality of tension members;
   wherein the plurality of tension members are arrayed across the belt width direction, the jacket material further disposed between adjacent tension members of the plurality of tension members in the belt width direction.

8. The elevator system of claim 7, wherein the fabric further includes carbon fibers, glass fibers, aramid fibers, ultrahigh molecular weight polyethylene, ultrahigh molecular weight polypropylene, polybenzoxazole fiber or nylon formed as part of the fabric including a plurality of aromatic polyester based fibers.

9. The elevator system of claim 7, wherein the tension member includes:
   a cord including a plurality of load carrying fibers; and
   at least one layer of aromatic polyester based fibers at least partially surrounding the cord.

10. The elevator system of claim 9, wherein the load carrying fibers are one or more of carbon, glass, aramid, nylon, and polymer fibers.

11. The elevator system of claim 9, wherein the plurality of load carrying fibers are disposed in a matrix material.

* * * * *